May 15, 1934.  H. L. BERNARDE  1,958,883
ELECTRICAL FREQUENCY RESPONSIVE SYSTEM
Filed March 11, 1933
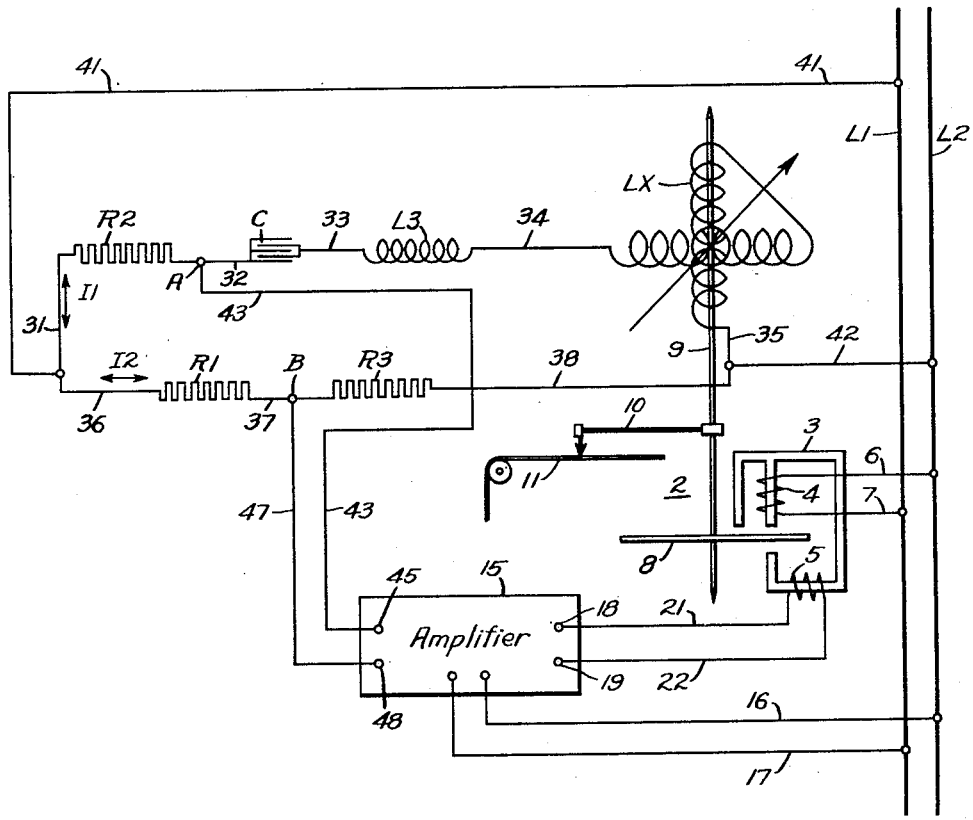
WITNESSES:
INVENTOR
Henry L. Bernarde.
BY
ATTORNEY Patented May 15, 1934

1,958,883

UNITED STATES PATENT OFFICE 1,958,883

ELECTRICAL FREQUENCY RESPONSIVE SYSTEM

Henry L. Bernarde, Kearny, N. J., assignor to Westinghouse Electric & Manufacturing Company, East Pittsburgh, Pa., a corporation of Pennsylvania Application March 11, 1933, Serial No. 660,355

9 Claims. (Cl. 172—245)

My invention pertains to electrical frequency responsive systems for controlling indicators, recorders, regulators or other devices in accordance with the frequency variations of a source of alternating current.

It is an object of my invention to provide an electrical frequency responsive system which will actuate a device in accordance with the frequency variations of a source of alternating current, and which will be accurate, self-calibrating, and anti-hunting.

It is another object of my invention to provide a frequency responsive system which will control an indicating device through a sensitive electronic amplifier and not be susceptible to inaccuracies caused by the tube characteristics varying with age or replacement.

A further object of my invention is to provide a frequency recorder which is sensitive and accurate.

Another object of my invention is to provide a self-calibrating zero-balancing system for controlling indicating instruments accurately, irrespective of variable conditions in the system or instrument.

In accordance with my invention, I connect the observed source of alternating current to an automatically balancing resonance bridge system comprising a variable inductance or capacity which is automatically adjusted to rebalance the bridge whenever the frequency of the source of alternating current varies. The degree of adjustment necessary to balance the bridge is an indication of the frequency variations and is rendered manifest by connecting a pointer or a recorder pen to be actuated simultaneously with the adjustable element of the bridge. A regulating member or other device may be connected with the adjusting member to be controlled simultaneously therewith.

Since the system is always automatically rebalanced until the potential across the bridge is zero, it is not susceptible to inaccuracies caused by varying conditions, and it is possible to utilize an electronic amplifier to make the system extremely sensitive and to obtain sufficient power to operate comparatively heavy apparatus with no appreciable lag.

The invention itself, however, both as to its organization and its method of operation, together with additional objects and advantages thereof, will best be understood from the following detailed description, taken in conjunction with the accompanying drawing, in which the single figure is a diagrammatic view representing an embodiment of my invention.

Referring more specifically to the drawing, the apparatus comprises alternating current main line conductors L1 and L2, which may be a commercial service line, the frequency of which is to be observed, regulated or recorded.

A motor 2 of the two-phase induction disk type is provided for operating the adjustable element of the bridge and simultaneously moving another member for indicating, regulating or recording. The motor 2 comprises a two-phase field structure 3 having two windings 4 and 5 thereon. One of the windings 4 is connected by conductors 6 and 7 directly to the line L1, L2, from which it is normally energized. The energization of the other winding 5 is controlled in a manner which will be subsequently set forth. An eddy current disk 8 is mounted on a shaft 9 in cooperative relation to the field structure 3. The shaft 9 also supports an arm 10 which may comprise a pointer or pen to be moved in cooperative relation to a scale or record sheet 11.

An amplifier 15 is provided, which may be any good commercial 60-cycle amplifier, and it is connected by conductors 16 and 17 to the main line L1, L2 from which it is energized. The output terminals 18 and 19 of the amplifier 15 are connected by conductors 21 and 22 to the winding 5 of the two-phase motor 2.

The bridge network comprises an upper branch including conductor 31, resistor R2, conductor 32, condenser C, conductor 33, fixed inductance coil L3, conductor 34, a variable or adjustable inductance coil LX and conductor 35. The lower branch of the bridge may be traced through conductor 36, resistor R1, conductor 37, resistor R3 and conductor 38. The resistors R1, R2 and R3 of the first, second and third legs of the bridge may be equal non-inductive resistors. The fixed capacity condenser C, the fixed inductance coil L3 and the variable inductance coil LX, of the fourth leg of the bridge, are so selected that they may be tuned to resonance with the applied alternating current.

When so tuned the capacitive and inductive reactances neutralize each other and only the ohmic resistance remains normally in the fourth leg of the bridge. The combined ohmic resistance of these three elements is such that it is just equal to that of each one of the resistors R1, R2 and R3.

The variable inductance LX may comprise a stationary and a movable coil connected in series and disposed in coupled relation whereby the degree of coupling may be varied or reversed. Such a device may be similar to the well known variometers previously used in radio circuits, and its movable coil is mounted upon the shaft 9 of the two-phase motor 2 for automatic operation.

The bridge network is energized by alternating current from the main line by a circuit which may be traced from line conductor L1 through conductor 41 which joins both conductors 31 and 36 at the left hand end of the bridge, thence through both the upper and lower branches of the bridge, as previously traced, and by way of conductor 42 to the other main line conductor L2.

The output, or control circuit, of the bridge extends by way of conductor 43 which is joined to conductor 32 at point A, thence by way of conductor 43 to one of the input terminals 45 of the amplifier 15. The other side of the control circuit from the bridge extends by way of conductor 47, joined to the bridge conductor 37 at point B, to the other input terminal 48 of the amplifier.

The relative values of the capacity and inductance elements of the bridge are so selected that when they are tuned to resonance and the bridge is balanced at 60-cycles the small variable inductance LX is set at its center position thereby making an allowance for adjustment in either direction, whether the line frequency varies above or below 60-cycles.

When the bridge is tuned and balanced at 60-cycles, the capacitive reactance of the condenser C is exactly equal and opposite to the inductive reactance of the induction coils L3 and LX. Hence their reactances are completely neutralized and the only impedance offered is that caused by their ohmic resistances. Since this resistance is equal to that of the resistors R1, R2 and R3, there is no alternating current voltage impressed upon the input terminals 45 and 48 of the amplifier, and the winding 5 of the two-phase motor is not energized with impulses. When the line frequency varies from 60 cycles, the legs of the bridge comprising only the non-inductive resistors continue to offer the same resistance to the currents I1 and I2, but the leg comprising the inductances L3 and LX offer a greater impedance to the current I1 since the capacitive and the inductive reactances no longer neutralize each other, and the bridge is thus unbalanced.

A small alternating current voltage which now appears across points A, B of the bridge is impressed on the input terminals of the amplifier and is amplified to energize the winding 5 of the two-phase motor which then runs in one direction or the other, depending upon the phase relation of the impulses relative to the phase of the current from the line L1, L2 which energizes the other winding 4 of the motor. As the motor runs, it turns the variable inductance LX in the proper direction to increase or diminish its inductance and thereby retune the associated leg of the bridge to resonance at the new frequency.

If the unbalanced condition is caused by an increase in the frequency, the inductive reactance will predominate and the potential set up across points A, B of the bridge will have a certain predetermined phase relation relative to the alternating current potentials. If the frequency decreases the capacitive reactance will predominate and the alternating current potentials set up across points A, B will be reversed in their phase relation to the alternating current line potentials. Hence the phase relation of the impulses supplied from the amplifier to the motor 2 will vary in direction and degree depending upon whether the bridge was unbalanced by a frequency increase or decrease and the motor accordingly operates in one direction or the other at a speed which depends upon the degree of unbalance.

As the balance is restored the motor gradually comes to a stop without hunting. The amount of adjustment necessary to rebalance the bridge is a measure of the new frequency and this is indicated by the pointer or the pen on the arm 10 moving over the associated scale or record sheet.

It will be seen that I have provided a frequency responsive control system which is self-calibrating, accurate, anti-hunting, and provides sufficient power to actuate relatively heavy apparatus.

Although I have shown and described certain specific embodiments of my invention, I am fully aware that many modifications thereof are possible. My invention, therefore, is not to be restricted except as necessitated by the prior art and the scope of the appended claims.

I claim as my invention:

1. In combination, a source of alternating current, a bridge network energized therefrom including an adjustable element the impedance of which varies in accordance with the frequency of the applied alternating current, means for automatically adjusting said element to rebalance the bridge when the frequency of the applied alternating current varies, and a member associated therewith for actuation in accordance with the automatic adjustments necessary to rebalance the bridge.

2. In combination a source of alternating current, a bridge network energized therefrom including an adjustable element the impedance of which varies in accordance with the frequency of the applied alternating current, a two-phase device comprising two windings for automatically adjusting said element to rebalance the bridge when the frequency of the applied alternating current varies, means for energizing one of said windings directly from said alternating current source, means for energizing the other winding from the bridge, and a member associated therewith for actuation in accordance with the automatic adjustments necessary to balance the bridge.

3. In combination a source of alternating current, a bridge network energized therefrom including an adjustable element the impedance of which varies in accordance with the frequency of the applied alternating current, means for automatically adjusting said element to rebalance the bridge when the frequency of the applied alternating current varies, and a recorder marker associated therewith for actuation to create a record, in accordance with the automatic bridge balancing adjustments as a measure of the frequency variations.

4. In combination a source of alternating current, a bridge network energized therefrom including an adjustable element the impedance of which varies in accordance with the frequency of the applied alternating current, a two-phase device comprising two windings for automatically adjusting said element to rebalance the bridge when the frequency of the applied alternating current varies, means for energizing one of said windings directly from said alternating current source, means for energizing the other winding from the bridge, and indicator means associated therewith for actuation in accordance with the automatic bridge balancing adjustments as a measure of the frequency variations.

5. In combination with a source of alternating current, a bridge network energized therefrom having three legs of non-inductive resistance and a fourth leg including an inductance coil and a condenser normally tuned to resonance, means for adjusting said inductance coil comprising a two-phase device having two windings one of which is connected directly to the alternating current source, an amplifier having its output terminals connected to the second one of said windings and its input terminals connected across the bridge for automatically energizing the amplifier with current of a magnitude and phase relation which varies in accordance with the respective degree and direction of unbalancing of the bridge caused by frequency variations of said alternating current source whereby said two-phase device is operated to automatically adjust said inductance coil and rebalance the bridge circuit, and a recorder marker connected to said coil for actuation simultaneously therewith.

6. An automatically balancing bridge network comprising three legs of non-inductive resistance and a fourth leg comprising capacitive and inductive reactance elements and sufficient ohmic resistance to balance the bridge when it is turied in resonance to an applied alternating current, actuating means for varying one of said reactance elements, energizing means connected across normally equipotential points of said bridge for energizing said actuating means in accordance with an unbalanced condition of the bridge whereby the bridge is automatically rebalanced, and means associated therewith for simultaneous actuation.

7. A self-tuning resonance bridge circuit comprising a variable reactance element normally adjusted to resonance with an alternating current source the frequency of which is to be recorded, means connected across the normally equipotential points of the bridge circuit for adjusting said variable reactance in accordance with unbalanced alternating current potentials, and a recorder member associated therewith for simultaneous operation.

8. In a frequency recording system a resonance circuit comprising a variable reactance element, means for automatically tuning said circuit to resonance with an alternating current source and a recorder member associated therewith for simultaneous operation to make a record in accordance with the frequency variations of said source.

9. The combination with an alternating current source, and an associated circuit normally tuned to resonance, of means operable in accordance with the frequency variations of said alternating current source comprising a two-phase device having two windings, means for energizing one of said windings directly from said alternating current source, and means for energizing the second winding in accordance with the variations of frequency of said alternating current source relative to the resonant frequency of said tuned circuit.

HENRY L. BERNARDE.